United States Patent
Ketcher

(10) Patent No.: US 6,543,218 B2
(45) Date of Patent: Apr. 8, 2003

(54) PREVENTING EARLY DEGRADATION OF EXHAUST TREATMENT DEVICES

(75) Inventor: David Arthur Ketcher, Chelmsford (GB)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/682,328

(22) Filed: Aug. 21, 2001

(65) Prior Publication Data
US 2002/0020169 A1 Feb. 21, 2002

(30) Foreign Application Priority Data
Aug. 21, 2000 (GB) ............................................ 00307135

(51) Int. Cl.⁷ .................................................. F01N 3/00
(52) U.S. Cl. ............................. 60/285; 60/274; 60/311; 60/284
(58) Field of Search ................. 60/274, 286, 285, 60/284, 299, 311

(56) References Cited

U.S. PATENT DOCUMENTS

| | | | | |
|---|---|---|---|---|
| 3,827,237 A | * | 8/1974 | Linder et al. ............... | 123/299 |
| 4,011,651 A |   | 3/1977 | Bradbury et al. | |
| 5,055,274 A | * | 10/1991 | Abbott ......................... | 60/299 |
| 5,174,969 A | * | 12/1992 | Fischer et al. .............. | 123/299 |
| 5,190,571 A | * | 3/1993 | Fay et al. ...................... | 60/272 |
| 5,298,046 A | * | 3/1994 | Peisert ......................... | 60/284 |
| 5,413,766 A |   | 5/1995 | Dattge et al. | |
| 5,644,913 A | * | 7/1997 | Iwai et al. ..................... | 60/284 |
| 5,882,608 A | * | 3/1999 | Sanocki et al. ............. | 422/179 |
| 5,956,942 A | * | 9/1999 | Sebastiano et al. ........... | 60/284 |
| RE36,737 E | * | 6/2000 | Brehob et al. ................ | 60/284 |
| 6,077,483 A | * | 6/2000 | Locker et al. ............... | 123/299 |
| 6,293,095 B1 | * | 9/2001 | Yamamoto et al. ........... | 60/272 |
| 6,360,531 B1 | * | 3/2002 | Wiemero et al. ........... | 123/299 |

FOREIGN PATENT DOCUMENTS

| | | |
|---|---|---|
| DE | 3827863 A1 | 2/1990 |
| DE | 19858025 * | 6/2000 |
| EP | 0 192 417 | 2/1986 |

\* cited by examiner

Primary Examiner—Thomas Denion
Assistant Examiner—Diem Tran
(74) Attorney, Agent, or Firm—Allan J. Lippa; John D. Russell

(57) ABSTRACT

A method is described for preventing early degradation of an exhaust treatment device installed in a diesel powered vehicle, the treatment device having an active element located within a casing by means of a mat surrounding the active element. The method comprises temporarily operating the engine at an early stage following the installation of the exhaust treatment device in an alternative mode wherein the temperature of the exhaust treatment device is raised sufficiently to cause the mat surrounding the active element of the exhaust treatment device to pop.

20 Claims, 3 Drawing Sheets ive operating mode has been proposed, for example, for the purpose of regenerating a particulate trap by burning off the trapped soot particles. The present invention proposes running the engine in such a mode at an early stage in the life of the exhaust system to ensure that the mat holding the active element in place reaches the necessary temperature for it to pop and for it to hold the active element securely in place.

PREVENTING EARLY DEGRADATION OF EXHAUST TREATMENT DEVICES

BACKGROUND OF INVENTION

The present invention relates to a method of preventing early degradation of an exhaust treatment device installed in a diesel powered vehicle.

Exhaust treatment devices such as catalytic converters, including NOx traps and particulate traps, typically comprise an active element, constructed in a suitable manner to perform its desired function, arranged within a metal outer casing. The active element in the case of a catalytic converter may for example comprise a ceramic honeycomb (also referred to as a matrix or a brick) the surface of which includes particles of a catalyst such as platinum. Surrounding the honeycomb is a fibrous mat that acts as packaging to locate the honeycomb within its metal casing.

During manufacture of the exhaust treatment device, the mat is wrapped around the honeycomb before it is inserted into the casing. In operation of the engine, the exhaust treatment device is heated by the exhaust gases and by any exothermic catalytic reaction that takes place within the device and the resultant heating of the mat is relied upon to cause the mat to pop. The term "popping" refers to the expansion and stiffening of the mat, which serve to locate the honeycomb securely within its metal casing.

The temperature needed to cause the mat to pop, which is approximately 300° C., is attained during normal engine operation of spark ignition engines and early degradation of the exhaust treatment devices in such an engine is relatively uncommon.

The inventors herein have recognized that with diesel engines on the other hand, the exhaust gases are not as hot as with spark ignition engines. As a result, the exhaust treatment device often does not reach a sufficiently high temperature for the mat to pop naturally. Consequently, the vehicle may be driven with the fragile active element located only loosely within its casing and this can damage the active element. In particular, the active element will rattle in its casing and exhaust gases may escape untreated by passing around the active element. It is also possible for debris to block the active element causing loss of power.

SUMMARY OF INVENTION

According to the present invention, there is provided a method of preventing early degradation of an exhaust treatment device installed in a diesel powered vehicle, the treatment device having an active element located within a casing by means of a mat surrounding the active element, which method comprises temporarily operating the engine at an early stage following the installation of the exhaust treatment device in an alternative mode wherein the temperature of the exhaust treatment device is raised sufficiently to cause the mat surrounding the active element of the exhaust treatment device to pop.

It is possible to operate a diesel engine in a mode that raises the temperature of the exhaust system, but such a mode is unsuitable for normal vehicle operation. Such an alternative operating mode has been proposed, for example, for the purpose of regenerating a particulate trap by burning off the trapped soot particles. The present invention proposes running the engine in such a mode at an early stage in the life of the exhaust system to ensure that the mat holding the active element in place reaches the necessary temperature for it to pop and for it to hold the active element securely in place.

The mode of operating the engine to raise the temperature in the exhaust system may comprise varying any one or more of the air supply, injection quantity, injection timing and valve timing.

Preferably, during the alternative operating mode of the diesel engine, fuel is injected into the engine late in the power stroke to ensure the presence of unburned fuel in the exhaust gases. Such fuel will react with the surplus air that is always present in the exhaust gases of a diesel engine to raise the temperature of the exhaust system. Of course, such a mode of operation is undesirable under normal circumstance, as it is wasteful of fuel and increases the HC content of the exhaust feed gases. Nevertheless, the engine can be operated in such a mode temporarily without seriously affecting the vehicle driveability whenever it is desired to raise the temperature in the exhaust system.

It is further possible to throttle the air supply to the engine during the alternative mode of operation. Diesel engines normally operate with wide-open throttle and the load is varied by regulating the supply of fuel. If, however, the intake air is throttled, it has the effects of increasing the pumping losses of the engine to generate more heat and of reducing the mass air flow through the exhaust system to reduce the cooling effect of the surplus air.

For the purpose of ensuring the popping of the mat of an exhaust treatment device, the alternative mode of operation need only be brought into effect once in the lifetime of the device. Such mode switching may be effected either manually or automatically. If effected manually, it can be carried out as part of the vehicle manufacturing process or pre-delivery inspection. A command may be given to the engine electronic control unit to operate in the alternative mode, if such a mode is programmed into the ECU, or the ECU control may be overridden temporarily by an external control unit connected to the engine during vehicle assembly.

For the alternative mode to be triggered automatically, it may be programmed into the engine's ECU and the latter may be additionally be programmed to operate in the alternative mode when a predetermined condition is detected for the first time, such as when a certain mileage is exceeded by the vehicle or the engine exceeds a given load. Once the alternative mode has been activated for sufficient time to cause the mat of the exhaust treatment device to pop, a flag may be set in the memory of ECU to prevent the engine from running in this mode again for the same purpose. Of course, the alternative mode may be instigated for other reasons by the ECU, such as to regenerate a particulate trap.

It is an important advantage of the invention that it may be implemented inexpensively in software in that popping of the mat in the exhaust treatment device can be ensured by simply reprogramming of the engine's ECU or by reprogramming of equipment used in the vehicle assembly line.

BRIEF DESCRIPTION OF DRAWINGS

The invention will now be described further, by way of example, with reference to the accompanying drawings, in which.

DETAILED DESCRIPTION

Figure 1:
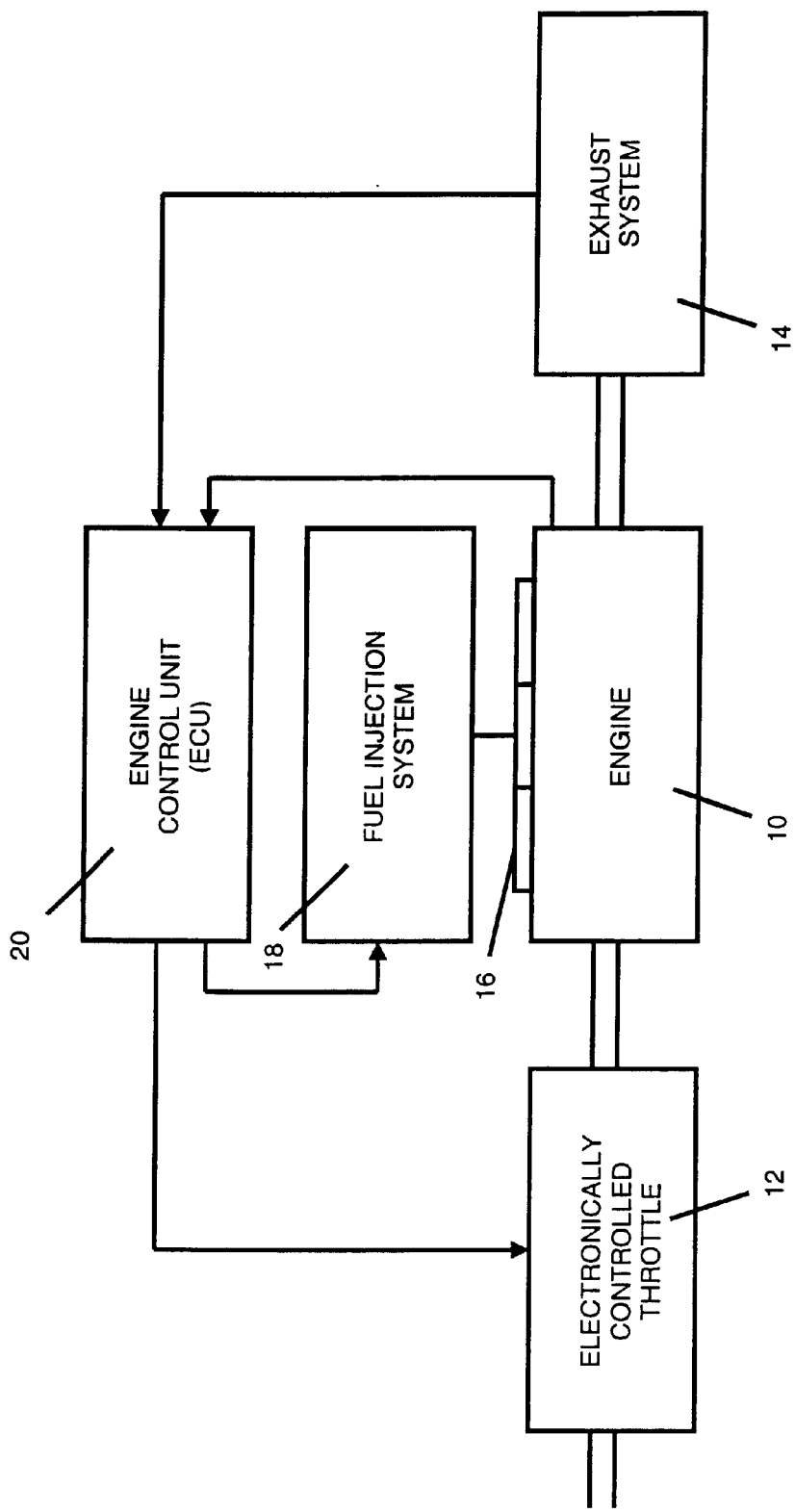
FIG. 1 is a diagrammatic representation of a diesel engine management system.

FIG. 1 shows a diesel engine 10 having an electronically controlled throttle 12 in its intake system and an exhaust system 14 that includes a treatment device having an active element retained by a mat in a metal casing.

A fuel injection system 18 supplies fuel under pressure to a fuel rail 16 and controls that are connected to the fuel rail and supply fuel to the different engine cylinders. An engine control unit (ECU) 20 receives signals from the engine and the exhaust system and sends control signals to the electronically controlled throttle 12 and the fuel injection system.

The ECU contains programs that enable it to operate in one of two modes. In the first mode, for normal operation of the engine, the electronically controlled throttle 12 is maintained wide open and the fuel injection system injects a quantity of fuel determined by the ECU 20 on the basis of the demand pedal position. The injection of fuel occurs near top dead center at the end of the compression stroke so that the fuel spontaneously ignites and burns completely by the time of commencement of the exhaust stroke so that little unburned fuel enters the exhaust system. Such fuel as does escape is oxidized in a catalytic converter that is incorporated in the exhaust system 14.

During this mode of operation of the engine, the exhaust gases reach a temperature in excess of the light off temperature of the catalytic converter, but not high enough to cause the mat of a new exhaust treatment device to pop.

To cause a mat in the exhaust system to pop, the exhaust temperature can be raised by operating the engine in the alternative mode. In this case, the electronically controlled throttle 12 is partially closed to supply less air. The increased pumping losses cause more heat to be generated and the reduction in mass airflow reduces the cooling of the exhaust gases. In addition, additional fuel is injected into the engine cylinders late in the power stroke or even during the exhaust stroke. Such fuel escapes from the combustion chamber but reacts in the catalytic converter with surplus air to generate more heat in the exhaust system. By operating the engine in this manner it is possible to raise the temperature of the mat in a new exhaust treatment device to the temperature at which it pops and holds the active element of the device securely in place.

It is possible to produce excess fuel in the exhaust system by varying the valve timing. Early exhaust valve opening would have the effect of allowing gases to enter the exhaust system before combustion is complete and the completion of combustion in the exhaust system would increase the temperature of the treatment device. Also, if when the engine is throttled the amount of fuel injected is more than required for stoichiometry, the surplus fuel will enter the exhaust system where it can be reacted with bypass air to raise the temperature of the exhaust system. The excess fuel could, as a further possibility, be injected directly into the exhaust system using an auxiliary injector, if such is available. The invention can be implemented using any strategy that raises exhaust gas temperature but the combination of engine throttling and a second fuel injection into the cylinders is preferred as it does not require any structural modification to the engine and the engine can be operated in the alternative mode without seriously impairing driveability.

For the purposes of the present invention, the operation of the engine in the alternative mode to generate a high exhaust temperature is only required once in the lifetime of an exhaust gas treatment device. The routine for instigating operation in the alternative mode is illustrated by the flow chart in FIG. 2.

Figure 2:
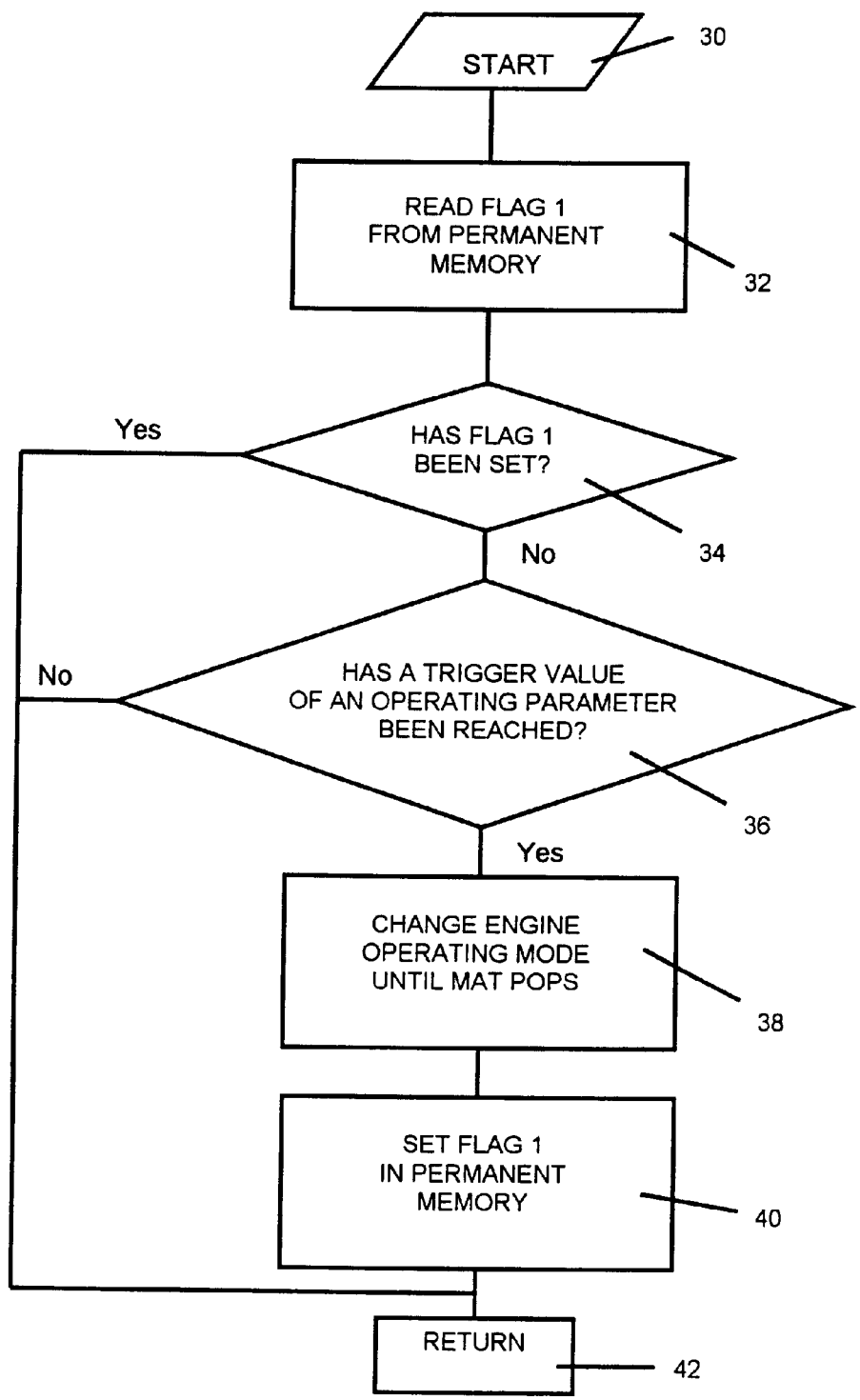
FIG. 2 is a flow chart of a routine implement in the ECU to ensure popping of the mat holding the active element of an exhaust treatment device in place in its casing.

When a vehicle is new or when a new treatment device is installed, a flag in the non-volatile memory of the ECU 20 is set to "zero". During each run, the routine in FIG. 2 is run by the ECU to avoid early degradation of the treatment device.

After the start of the routine in step 30, the program reads Flag 1 to see if it is still at "zero" or if it has already been reset to "one". In the decision block 34 the program will exit the sub-routine through the RETURN step 42 if Flag 1 has already be reset to "one", indicating that the mat has previously been popped. If Flag 1 has not been reset, then a decision is made as to whether this is an appropriate occasion to pop the mat of the treatment device. This decision may, for example, depend on the vehicle mileage or other factors such as the prevailing the engine speed and load. In this decision step 36, the value of one or more such engine parameters is compared with a trigger value and, if the specified conditions for popping the mat are satisfied, then, in block 38, the alternative engine operating mode is initiated and maintained until the mat pops. The popping can either be determined from a measurement of the temperature of the exhaust treatment device or by estimation of the temperature from the length of the time that the alternative mode is activated.

Once the mat is estimated to have popped, Flag 1 is set to a value of "one" in step 40 and the sub-routine is terminated in step 24.

The implementation is based on reprogramming of the ECU to activate an alternative mode of operation automatically when certain conditions occur for the first time in the life of a new exhaust treatment device. The instigation of the alternative mode of engine operation may be carried out manually during pre-delivery inspection or at a suitable stage in the vehicle assembly. It is also not essential for the ECU to be reprogrammed to operate in the alternative mode as this may be done by servicing equipment connected the vehicle which overrides the operation of the ECU.

It has been suggested to use an alternative operation of the engine to regenerate a particulate trap. Running an engine in the alternative mode for trap regeneration will automatically cause a mat to pop but may not occur until the treatment device has already degraded. In an engine having an ECU programmed to regenerate the trap, the invention can be implemented by simply modifying the ECU to program to activate the alternative mode in the manner described above with reference to FIG. 2.

Figure 3:
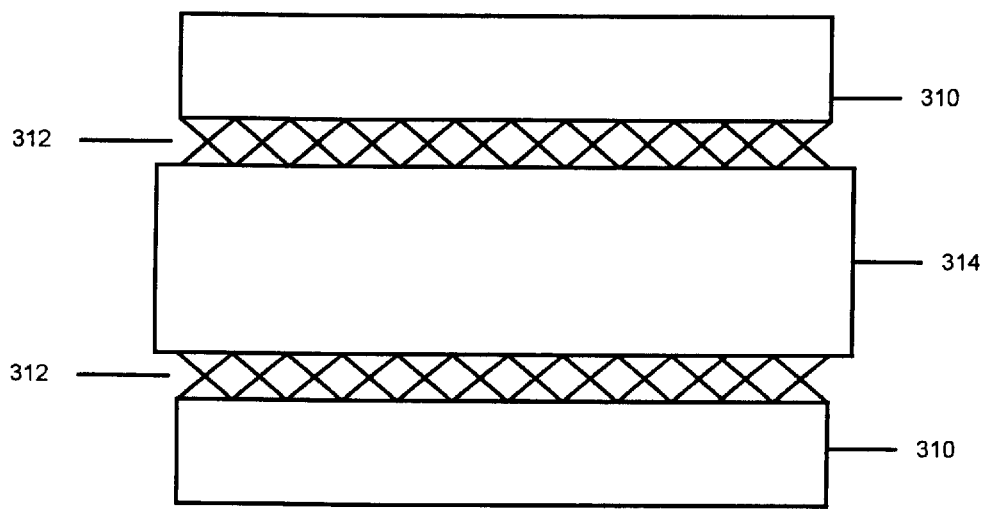
FIG. 3 shows a cross-section of the exhaust treatment device.

FIG. 3 shows a cross-section of an exhaust treatment device. Active element 314 is surrounded by fibrous mat 312, which locates element 314 within metal casing 310.

What is claimed is:

1. A method of preventing early degradation of an exhaust treatment device installed in a diesel powered vehicle, the treatment device having an active element located within a casing by means of a mat surrounding the active element, which engine in normal operation does not reach a temperature which causes the mat to expand and secure the exhaust treatment device during initial operation, which method comprises temporarily operating the engine at an early stage following the installation of the exhaust treatment device in an alternative mode wherein the temperature of the exhaust treatment device is raised sufficiently to cause the mat surrounding the active element of the exhaust treatment device to pop.

2. A method as claimed in claim 1, wherein the mode of operating the engine to raise the temperature in the exhaust system comprises varying any one or more of the air supply, injection quantity, injection timing and valve timing.

3. A method as claimed in claim 2, wherein, during the alternative operating mode of the diesel engine, fuel is injected into the engine late in the power stroke or directly into the exhaust to ensure the presence of unburned fuel in the exhaust gases.

4. A method as claimed in claim 2, wherein, during the alternative mode of operation, the air supply to the engine is throttled.

5. A method as claimed in claim 4, wherein the alternative mode of engine operation to cause the mat of the exhaust treatment device to pop is initiated manually during assembly or pre-delivery inspection of the vehicle.

6. A method as claimed in claim 1, wherein the engine has a control unit programmed to operate the engine selectively in a normal mode and in the alternative mode and wherein the control unit is programmed additionally to initiate operation in the alternative mode automatically when predetermined operating conditions are satisfied following the installation of a new exhaust treatment device.

7. A method for operating a diesel engine having an exhaust treatment device, the treatment device having an active element located within a casing, with a mat surrounding the active element, which engine in normal operation does not reach a temperature which causes the mat to expand and secure the exhaust treatment device during initial operation, the method comprising:
   requesting an alternative mode of operation following installation of the exhaust treatment device; and
   increasing exhaust temperature of the diesel engine in response to said request to cause the mat surrounding the active element of the exhaust treatment device to expand and stiffen so that said active element is secured to said casing.

8. The method recited in claim 7 wherein said exhaust temperature is increased beyond 300 degrees C.

9. The method recited in claim 7 wherein said increasing temperature occurs before normal regeneration of a particulate filter coupled to the engine.

10. The method recited in claim 7 wherein the engine is a diesel fueled engine.

11. A system for a diesel engine, comprising:
   a treatment device comprising:
      a casing,
      an active element located within said casing, and
      a mat surrounding said active element, wherein the engine, in normal operation, will not reach a temperature which causes the mat to expand and secure the exhaust treatment device during initial operation;
   a controller for requesting an alternative operating mode, and in response to said request, adjusting an operating parameter to increase exhaust gas temperature and expand and stiffen said mat to locate said active element within said casing.

12. The system of claim 10 wherein said mat is a fibrous mat.

13. The system recited in claim 11 wherein said treatment device is coupled to the diesel engine.

14. A method of preventing early degradation of an exhaust treatment device installed in an engine powered vehicle, the treatment device having an active element located within a casing by a mat surrounding the active element, which engine in normal operation will not reach a temperature which causes the mat to expand and secure the exhaust treatment device during initial operation, which method comprises;
   temporarily operating the engine at an early stage following the installation of the exhaust treatment device in an alternative mode wherein the temperature of the exhaust treatment device is raised sufficiently to cause the mat surrounding the active element of the exhaust treatment device to secure the active element.

15. A method as claimed in claim 14, wherein the mode of operating the engine to raise the temperature in the exhaust system comprises varying any one or more of the air supply, injection quantity, injection timing and valve timing.

16. A method as claimed in claim 15, wherein, during the alternative operating mode of the diesel engine, fuel is injected into the engine late in the power stroke or directly into the exhaust to ensure the presence of unburned fuel in the exhaust gases.

17. A method as claimed in claim 15, wherein, during the alternative mode of operation, the air supply to the engine is throttled.

18. A method as claimed in claim 17, wherein the alternative mode of engine operation to cause the mat of the exhaust treatment device to pop is initiated manually during assembly or pre-delivery inspection of the vehicle.

19. A method as claimed in claim 14, wherein the engine has a control unit programmed to operate the engine selectively in a normal mode and in the alternative mode and wherein the control unit is programmed additionally to initiate operation in the alternative mode automatically when predetermined operating conditions are satisfied following the installation of a new exhaust treatment device.

20. The method recited in claim 14 wherein said engine is a diesel fueled engine.

* * * * *